US012231043B2

(12) United States Patent
Tilotta et al.

(10) Patent No.: US 12,231,043 B2
(45) Date of Patent: Feb. 18, 2025

(54) ADAPTIVE DC/DC PWM CONTROL (71) Applicant: VERTIV CORPORATION, Columbus, OH (US)

(72) Inventors: Livio Alessandro Tilotta, Imola (IT); Stefano Pecorari, Modena (IT)

(73) Assignee: Vertiv Corporation, Westerville, OH (US)

( * ) Notice: Subject to any disclaimer, the term of this patent is extended or adjusted under 35 U.S.C. 154(b) by 191 days.

(21) Appl. No.: 17/976,488

(22) Filed: Oct. 28, 2022

(65) Prior Publication Data
US 2023/0137678 A1 May 4, 2023

Related U.S. Application Data (60) Provisional application No. 63/273,506, filed on Oct. 29, 2021.

(51) Int. Cl.
*H02M 3/158* (2006.01)
*H02J 9/06* (2006.01)
*H02M 3/157* (2006.01)

(52) U.S. Cl.
CPC ............. *H02M 3/158* (2013.01); *H02J 9/062* (2013.01); *H02M 3/157* (2013.01)

(58) Field of Classification Search
CPC ......... H02M 3/158; H02M 3/157; H02J 9/062
See application file for complete search history.

(56) References Cited

U.S. PATENT DOCUMENTS

| 5,049,804 | A | 9/1991 | Hutchings |
| 5,619,076 | A | 4/1997 | Layden et al. |
| 7,667,351 | B2 | 2/2010 | Marwali et al. |
| 7,668,624 | B2 | 2/2010 | Heber et al. |
| 7,999,513 | B1 | 8/2011 | Cohen et al. |
| 9,190,896 | B2 | 11/2015 | Chen et al. |
| 9,419,455 | B2 | 8/2016 | Wang et al. |
| 10,153,658 | B2 | 12/2018 | Nandam et al. |
| 10,230,252 | B2 | 3/2019 | Noor et al. |
| 10,491,033 | B2 | 11/2019 | Wei et al. |
| 10,644,581 | B2 * | 5/2020 | El Markhi .......... H02M 3/1563 |
| 11,063,471 | B2 | 7/2021 | Nandam et al. |
| 11,424,678 | B2 * | 8/2022 | Nam ..................... H02M 3/158 |
| 11,469,670 | B2 * | 10/2022 | Pahkala ................ H02M 3/157 |
| 2010/0148583 | A1 | 6/2010 | Kukunuri |
| 2012/0153899 | A1 | 6/2012 | Marschalkowski et al. |

(Continued)

FOREIGN PATENT DOCUMENTS

| CN | 111525635 A | 8/2020 |
| CN | 112440813 B | 5/2022 |
| EP | 3817182 A2 | 5/2021 |

*Primary Examiner* — Adolf D Berhane
(74) *Attorney, Agent, or Firm* — Suiter Swantz IP (57) ABSTRACT An adaptive direct current (DC) conversion system may include a multi-mode DC converter circuit including two or more power switches, where the multi-mode DC converter circuit is operable in two or more pulse width modulation (PWM) modes based on two or more PWM signal sets provided to the two or more power switches. The system may further include a PWM controller, where the PWM controller controls which of the two or more PWM modes the multi-mode DC converter circuit operates in by providing the multi-mode DC converter circuit with the associated one of the two or more PWM signal sets.

31 Claims, 9 Drawing Sheets (56) References Cited

U.S. PATENT DOCUMENTS

| | | |
|---|---|---|
| 2018/0331569 A1 | 11/2018 | Pecorari et al. |
| 2019/0098723 A1* | 3/2019 | Sadwick ................. F21K 9/272 |
| 2023/0291301 A1* | 9/2023 | Sivaraj ................... H02M 1/08 |
| 2024/0176374 A1* | 5/2024 | Kim ......................... G05F 1/56 |

* cited by examiner

ADAPTIVE DC/DC PWM CONTROL

CROSS-REFERENCE TO RELATED APPLICATION

The present application claims the benefit under 35 U.S.C. § 119(e) of U.S. Provisional Application Ser. No. 63/273,506, filed Oct. 29, 2021, entitled ADAPTIVE DC/DC PWM CONTROL, naming Livio Alessandro Tilotta and Stefano Pecorari as inventors, which is incorporated herein by reference in the entirety.

TECHNICAL FIELD

The present disclosure relates generally to DC/DC converters and, more particularly, to adaptive PWM control of DC/DC converters

BACKGROUND

DC/DC converters are widely used to convert and/or regulate an input voltage of a direct current (DC) source to a desired output voltage. Various architectures are possible such as, but not limited to, a buck converter (e.g., a step-down converter) to reduce the input voltage to a lower output voltage, a boost converter (e.g., a step-up converter) to increase the input voltage to a higher output voltage, or a buck-boost converter to provide a regulated voltage in response to a range of input voltages. However, existing DC/DC converters fail to adequately provide both rapid responsivity and energy-efficient operation under diverse operating conditions such as, but not limited to, dynamic grid support (DGS) applications. There is therefore a need to develop systems and methods for advanced DC/DC conversion.

SUMMARY

An adaptive direct current (DC) conversion system is disclosed in accordance with one or more illustrative embodiments of the present disclosure. In one illustrative embodiment, the system includes a multi-mode DC converter circuit including two or more power switches, where the multi-mode DC converter circuit is operable in two or more pulse width modulation (PWM) modes based on two or more PWM signal sets provided to the two or more power switches. In another illustrative embodiment, the system includes a PWM controller, where the PWM controller controls which of the two or more PWM modes the multi-mode DC converter circuit operates in by providing the multi-mode DC converter circuit with the associated one of the two or more PWM signal sets.

An uninterruptible power supply (UPS) is disclosed in accordance with one or more illustrative embodiments of the present disclosure. In one illustrative embodiment, the UPS includes a rectifier to rectify input power from an electrical grid. In another illustrative embodiment, the UPS includes a battery. In another illustrative embodiment, the UPS includes a DC conversion system coupled to the battery. In another illustrative embodiment, the DC conversion system includes a multi-mode DC converter circuit including two or more power switches, where the multi-mode DC converter circuit is operable in two or more PWM modes based on two or more PWM signal sets provided to the two or more power switches. In another illustrative embodiment, the DC conversion system includes a PWM controller, where the PWM controller controls which of the two or more PWM modes the multi-mode DC converter circuit operates in by providing the multi-mode DC converter circuit with the associated one of the two or more PWM signal sets. In another illustrative embodiment, the UPS includes an inverter to generate an alternating current (AC) power output from at least one of the rectifier or the DC conversion system.

In some embodiments, the UPS with the adaptive DC conversion system is suitable for selective operation in either a standard UPS state or a dynamic grid support (DGS) state. For example, the UPS may utilize any of a number of complementary PWM signal sets to modulate at least one pair of power switches in the multi-mode DC converter circuit with a complementary pattern to provide high responsivity. In this way, any of a number of DGS functions may be implemented using complementary PWM signal sets. By way of another example, the UPS may utilize a single PWM signal set to modulate a single power switch in the multi-mode DC converter circuit to provide power-efficient operation in the standard UPS state. In this way, the UPS may provide highly responsive DGS operations when necessary and power efficient operation when DGS operations are not necessary.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for adaptive pulse width modulation (PWM) mode control of a switched-mode DC/DC converter, herein referred to simply as a direct current (DC) converter.

Switched-mode DC converters are a class of DC converters that utilize one or more power switching elements such as, but not limited to, transistors to selectively direct energy from an input source to energy storage components (e.g., inductors, capacitors, or the like) in order to provide a regulated output voltage. Switched-mode DC converters typically include a PWM controller to provide PWM signals that drive the power switching elements. In this way, various aspects of the PWM signals such as, but not limited to, the duty cycle may be used to control or tune the operation of the DC converter.

Switched-mode DC converters may be flexibly designed to provide varied functionality based on the configurations of the power switches and the energy storage components. For example, switched-mode DC converters may be implemented in a variety of voltage regulation functions such as buck converters, boost converters, or buck-boost converters. By way of another example, switched-mode DC converters may provide for both uni-directional and bi-directional power flow operations.

It is contemplated herein that different designs or operational modes of a DC converter may provide different performance tradeoffs. For example, the operation of the power switches may result in various power losses such as, but not limited to, switching losses, conduction losses, or inductor losses. As a result, increasing a number of operational power switches may increase the overall system losses. However, designs incorporating multiple switches may provide desirable benefits such as increased temporal responsivity for high-speed operation. It may thus be the case that different designs or operational modes may be suitable for different circumstances.

Embodiments of the present disclosure are directed to dynamic control of a DC converter for operation in two or more PWM modes (e.g., two or more configurations of power switches). In this way, the performance of the DC converter may be dynamically tailored for different operating conditions during run-time (e.g., on the fly). In some embodiments, an adaptive DC converter system includes a multi-mode DC converter circuit capable of operation in two or more PWM modes and an adaptive PWM controller to provide PWM signal sets to the power switches of the multi-mode DC converter circuit associated with the two or more PWM modes. For example, an adaptive DC converter system may operate using a single PWM mode in which a single power switch is operational. Such a single PWM mode may be suitable for, but is not limited to, operating inductors of the DC converter in a discontinuous conduction mode (DCM), which may provide relatively low power losses, particularly when the converted current is low. By way of another example, an adaptive DC converter system may operate using a complementary PWM mode in which one or more pairs of power switches are operated with complementary PWM signals. Such a complementary PWM mode may be suitable for, but is not limited to, operating inductors of the DC converter in a continuous conduction mode (CCM), which may provide relatively fast responsivity (e.g., fast dynamic responses) but have relatively higher losses than a single PWM mode when the converter current is low. In this way, an adaptive DC converter system may selectively operate in a complementary PWM mode when high responsivity is required and operate in a single PWM mode when high responsivity is not required and/or when power efficient operation is desired.

It is further contemplated herein that an adaptive DC converter system as disclosed herein may provide PWM modes associated with any voltage regulation scheme including, but not limited to, a buck converter, a boost converter, a buck-boost converter, or a dynamically-controllable combination thereof.

Some embodiments of the present disclosure are directed to an uninterruptible power supply (UPS) with dynamic grid support (DGS) that includes an adaptive DC converter system. It is contemplated herein that DGS features may place significant demands on a UPS such as, but not limited to, a requirement that the battery converter including charger and booster modes must track power level references that vary relatively quickly (e.g., on the order of 10-100 ms in some applications). A DC converter circuit may thus require a configuration with multiple power switches to provide the necessary high-speed current loop performance. For instance, high-speed current loop performance may be obtained using a complementary PWM mode configuration with one or more pairs of power switches that are driven by complementary PWM signals (e.g., PWM signals in a complementary pattern) to provide CCM operation.

However, it is further contemplated herein that it may not be desirable for a UPS to operate in a complementary PWM mode at all times. For example, when the battery is near full charge, the load on the DC converter may be relatively low such that the current and the regulated power levels are also low. Under these conditions, a complementary PWM mode inducing CCM operation may result in unnecessary power losses (e.g., switching losses, conduction losses, inductor losses, or the like).

In some embodiments, a UPS with an adaptive DC converter system may selectively operate in either a complementary PWM mode providing high-speed current loop performance (e.g., for DGS operation) or a single PWM mode when such high-speed current loop performance is not required and/or at low load levels. In this way, the operational mode of the UPS and the associated performance tradeoffs may be dynamically adjusted based on the operating conditions. In particular, it is contemplated herein that a significant fraction of the total operating time of a UPS may correspond to low load conditions and/or times when high responsivity for DGS operation is not required. As a result, dynamically switching to a single PWM mode may provide substantial power savings while retaining the ability to provide dynamic DGS functionality when needed.

However, it is to be understood that an adaptive DC converter system is not limited to UPS applications and that descriptions of specific embodiments of a UPS with an adaptive DC converter system are merely illustrative and should not be interpreted as limiting.

Referring now to FIGS. 1A-3, systems and methods for adaptive DC conversion are described in greater detail in accordance with one or more embodiments of the present disclosure.

Figure 1A:
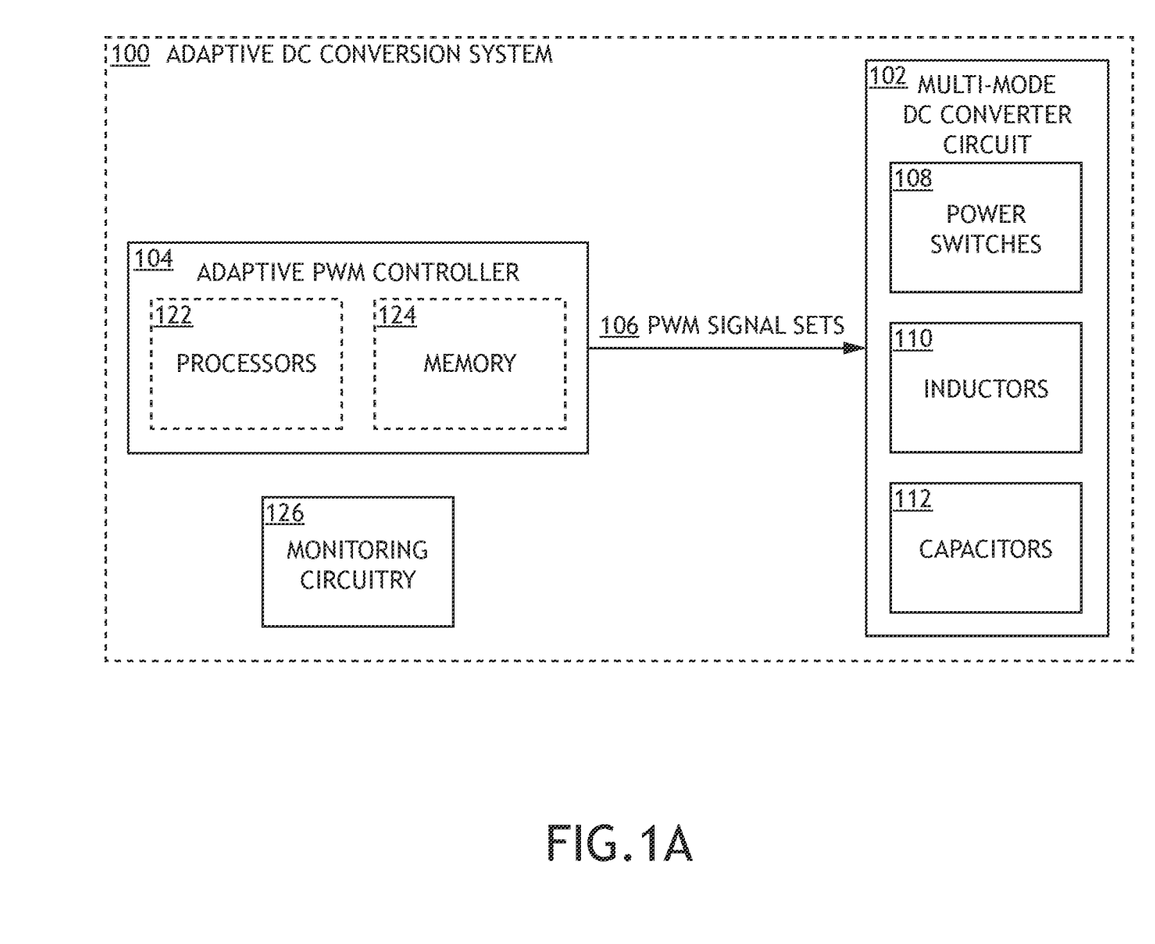
FIG. 1A is a block-level diagram of an adaptive DC conversion system, in accordance with one or more embodiments of the present disclosure.

FIG. 1A is a block-level diagram of an adaptive DC conversion system 100, in accordance with one or more embodiments of the present disclosure. In some embodiments, the adaptive DC conversion system 100 includes a multi-mode DC converter circuit 102 capable of operating in two or more PWM modes and an adaptive PWM controller 104 to provide PWM signal sets 106 to the multi-mode DC converter circuit 102 associated with the two or more PWM modes.

The multi-mode DC converter circuit 102 may include any type of switch-mode DC converter known in the art with two or more power switches 108 that accepts PWM signal sets 106 and may be configurable to operate in different modes based at least in part on the received PWM signal sets 106. In some embodiments, the multi-mode DC converter circuit 102 is a non-isolating switch-mode DC converter. For example, the multi-mode DC converter circuit 102 may include a buck converter, a boost converter, a buck-boost converter, or a combination thereof that is configurable based on the PWM signal sets 106. Further, the multi-mode DC converter circuit 102 may operate in a uni-directional power flow mode or a bi-directional power flow mode. The multi-mode DC converter circuit 102 may further include various additional energy storage and/or regulation components such as, but not limited to, inductors 110 and capacitors 112.

Figure 1B:
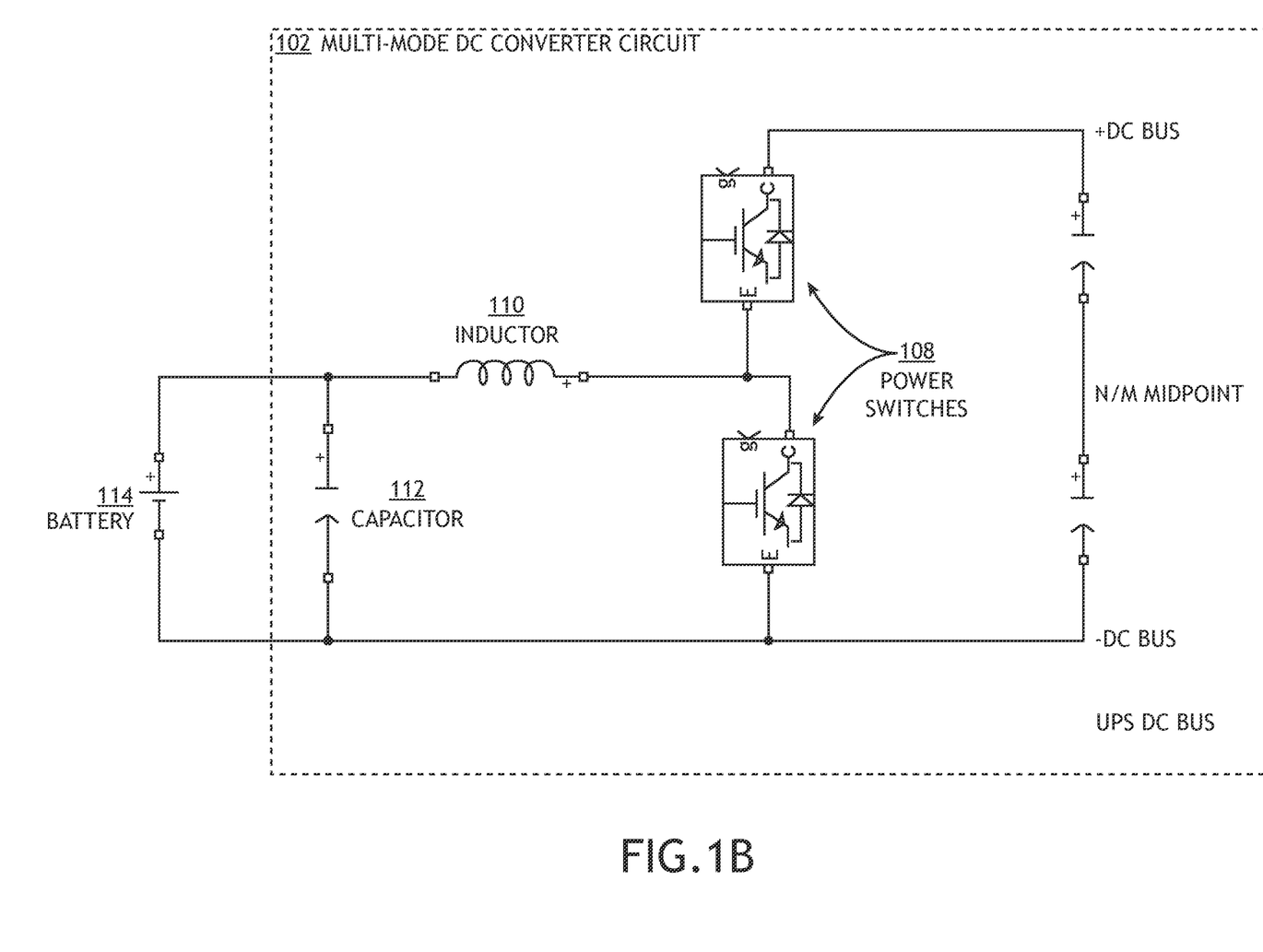
FIG. 1B is a conceptual schematic view of a multi-mode DC converter circuit, in accordance with one or more embodiments of the present disclosure.

FIG. 1B is a conceptual schematic view of a multi-mode DC converter circuit 102 in accordance with one or more embodiments of the present disclosure. In particular, FIG. 1B illustrates a buck-booster DC converter circuit including two power switches 108 along with an inductor 110 and a capacitor 112 for energy storage and power regulation. FIG. 1B further illustrates a battery 114 connected to the multi-mode DC converter circuit 102, which may be suitable for, but is not limited to, UPS applications. The performance and operation of the multi-mode DC converter circuit 102 may be tailored based on PWM signal sets 106 applied to the power switches 108.

Referring now to FIGS. 1C-1F, various PWM modes of the multi-mode DC converter circuit 102 are described in greater detail, in accordance with one or more embodiments of the present disclosure.

Figure 1C:
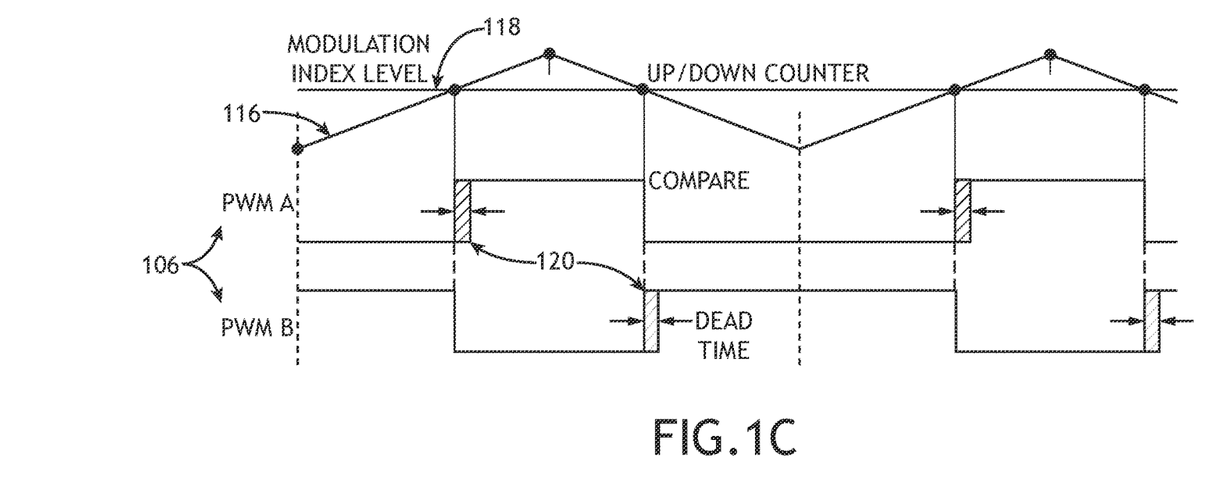
FIG. 1C is a conceptual view of a PWM signal set for a pair of power switches providing complementary PWM mode operation, in accordance with one or more embodiments of the present disclosure.

FIG. 1C is a conceptual view of a PWM signal set 106 for a pair of power switches 108 (e.g., PWM A and PWM B) providing complementary PWM mode operation, in accordance with one or more embodiments of the present disclosure. In particular, FIG. 1C illustrates a configuration in which the complementary PWM A and PWM B signals are generated according to a control signal 116, where the duty cycles are further controlled by a modulation index level 118 (e.g., a mod index level 118) applied to the control signal 116. Further, a complementary PWM signal set 106 need not be strictly complementary. Rather, as illustrated in FIG. 1C, dead time 120 or other delays may be introduced between the switching times of the individual PWM signals.

Figure 1D:
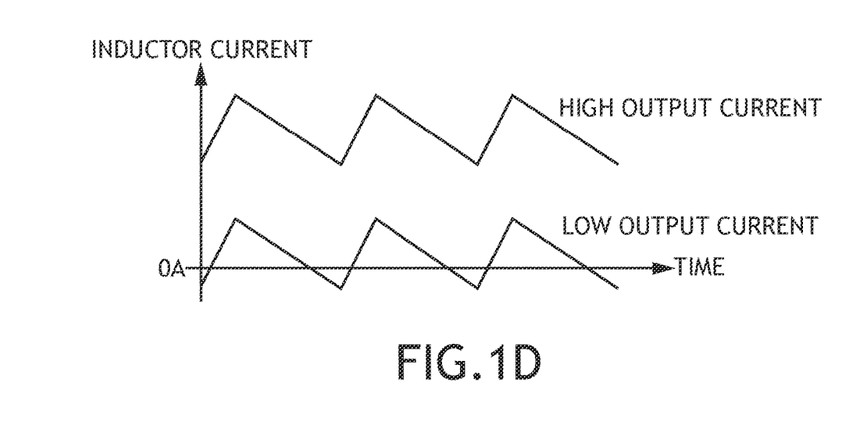
FIG. 1D is a conceptual view of inductor current over time for different output current levels associated with complementary PWM mode operation, in accordance with one or more embodiments of the present disclosure.

FIG. 1D is a conceptual view of inductor 110 current over time for different output current levels associated with complementary PWM mode operation, in accordance with one or more embodiments of the present disclosure. In particular, FIG. 1D illustrates CCM operation both at high and low output current levels. For example, a high current level may be a current sufficiently high that the current in the inductor 110 does not change sign during a PWM period, whereas a low current level may be a current sufficiently low that the current in the inductor 110 does change sign during a PWM period. As a result, various power losses associated with CCM such as, but not limited to, switching losses, conduction losses, and inductor 110 losses may be present regardless of the output current levels.

Figure 1E:
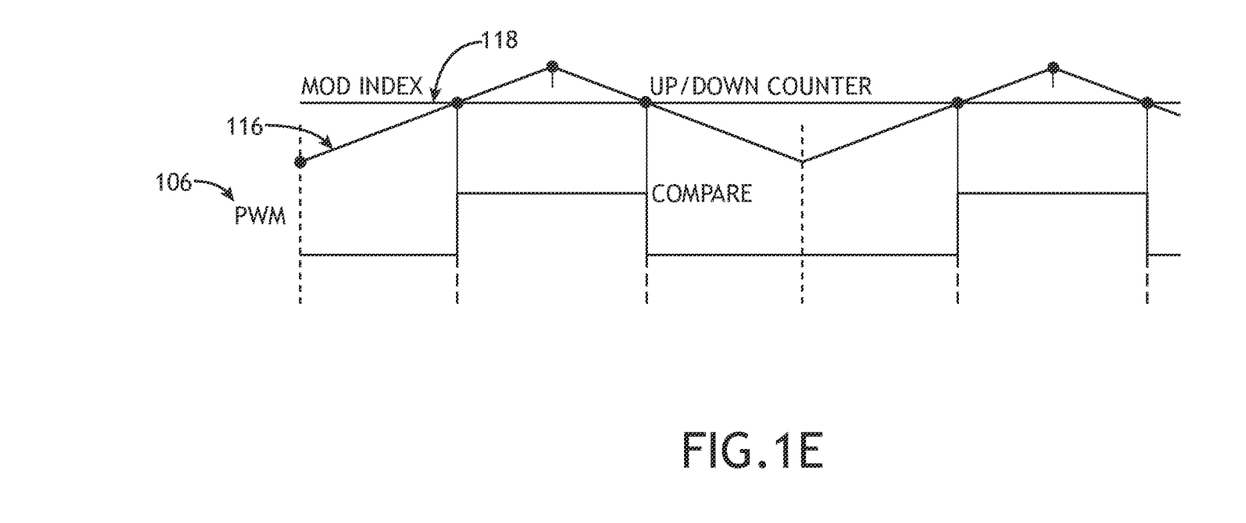
FIG. 1E is a conceptual view of a PWM signal set providing modulation of a single power switch in a single PWM mode, in accordance with one or more embodiments of the present disclosure.

FIG. 1E is a conceptual view of a PWM signal set 106 providing modulation of a single power switch 108 in a single PWM mode, in accordance with one or more embodiments of the present disclosure. Similar to the complementary PWM signal mode illustrated in FIG. 1C, the single modulated PWM signal is similarly controlled by a control signal 116 and the duty cycle depends on the modulation index level 118.

Figure 1F:
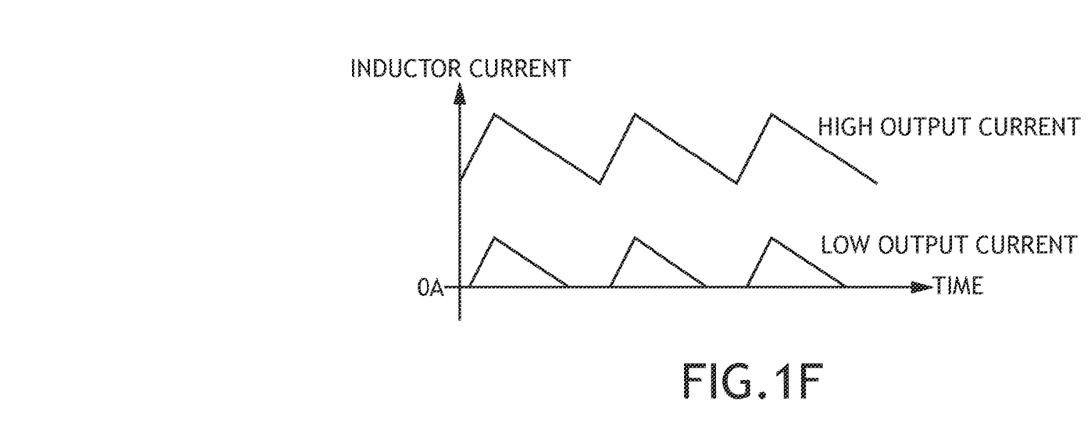
FIG. 1F is a conceptual view of inductor current over time for different output current levels associated with single PWM mode operation, in accordance with one or more embodiments of the present disclosure.

FIG. 1F is a conceptual view of inductor 110 current over time for different output current levels associated with single PWM mode operation, in accordance with one or more embodiments of the present disclosure. In particular, FIG. 1F illustrates CCM operation at high output current levels and DCM operation at low output current levels. For example, a high current level may be a current sufficiently high that the current in the inductor 110 does not change sign during a PWM period, whereas a low current level may be a current sufficiently low that the current in the inductor 110 reaches and stays at zero for a portion of a PWM period. As a result, various power losses associated with CCM such as, but not limited to, switching losses, conduction losses, and inductor 110 losses may be mitigated by operation in the single PWM operation when the output current is low such as, but not limited to, when the battery 114 is near full charge.

It is to be understood that FIGS. 1B-1F and the associated descriptions are provided solely for illustrative purposes and should not be interpreted as limiting. For example, the multi-mode DC converter circuit 102 may have any suitable design or number of the power switches 108 and energy storage elements (e.g., inductors 110, capacitors 112, or the like). In this way, the design of the multi-mode DC converter circuit 102 is not limited by the depiction in FIG. 1B. As another example, the multi-mode DC converter circuit 102 may be operational in any number of PWM modes based on different PWM signal sets 106 applied to the power switches 108. In this way, the multi-mode DC converter circuit 102 is not limited to operation in the PWM modes and associated PWM signal sets 106 depicted in FIGS. 1C-1F.

Referring again to FIG. 1A, the adaptive PWM controller 104 is described in greater detail in accordance with one or more embodiments of the present disclosure. The adaptive PWM controller 104 may include any type of PWM controller known in the art suitable for providing PWM signal sets 106 associated with two or more PWM modes of the multi-mode DC converter circuit 102.

In some embodiments, the adaptive PWM controller 104 includes one or more processors 122 configured to execute program instructions maintained on memory 124 (e.g., a memory medium). In this regard, the one or more processors 122 may execute any of the various process steps described throughout the present disclosure. The one or more processors 122 of the adaptive PWM controller 104 may include any processor or processing element known in the art. For the purposes of the present disclosure, the term "processor" or "processing element" may be broadly defined to encompass any device having one or more processing or logic elements such as, but not limited to, one or more digital signal processors (DSPs), one or more field-programmable gate arrays (FPGAs), one or more application specific integrated circuit (ASIC) devices, or one or more micro-processor devices. In this sense, the one or more processors 122 may include any device configured to execute algorithms and/or instructions.

The memory 124 may include any storage medium known in the art suitable for storing program instructions executable by the associated one or more processors 122.

For example, the memory 124 may include a non-transitory memory medium. By way of another example, the memory 124 may include, but is not limited to, a read-only memory (ROM), a random-access memory (RAM), a magnetic or optical memory device (e.g., disk), a magnetic tape, a solid-state drive, or the like. It is further noted that the memory 124 may be, but is not required to be, housed in a common controller housing with the one or more processors 122. In some embodiments, the memory 124 may be located remotely with respect to the physical location of the one or more processors 122, additional portions of the adaptive PWM controller 104, and/or components of the adaptive DC conversion system 100. For instance, the one or more processors 122 of the adaptive PWM controller 104 may access a remote memory 124 (e.g., a server), accessible through a network (e.g., internet, intranet, or the like). Moreover, the steps described throughout the present disclosure may be carried out by a single adaptive PWM controller 104 or, alternatively, multiple adaptive PWM controllers 104. In this way, references to specific hardware configurations herein are solely provided for illustrative purposes and should not be interpreted as limiting.

The adaptive PWM controller 104 may select and provide PWM signal sets 106 to the multi-mode DC converter circuit 102 for operation of the multi-mode DC converter circuit 102 in any of various PWM modes using any of a variety of techniques. In some embodiments, the adaptive PWM controller 104 receives a mode selection request that indicates a desired PWM mode. This mode selection request may include commands, triggers, or any other suitable control signals from an external source. The adaptive PWM controller 104 may then provide associated PWM signal sets 106 to the multi-mode DC converter circuit 102 circuit for operation in the desired mode. For example, the external source providing control signals relevant to the PWM mode may include a user input source. As another example, the external source providing control signals relevant to the PWM mode may include an external controller such as, but not limited to, a plant or grid controller. In some embodiments, the desired PWM mode is determined by monitoring circuitry 126, which may dynamically select the desired PWM mode based on present, expected, or projected operating conditions. The monitoring circuitry 126 may include any type or combination of components suitable for monitoring at least one of currents and/or voltages in the multi-mode DC converter circuit 102 and/or external components (e.g., one or more current monitors, one or more voltage monitors, one or more power monitors, or the like). For example, in the context of a UPS, the monitoring circuitry 126 may monitor aspects of a battery, grid input power, one or more loads connected to the UPS, or the like.

As an illustration in the context of a UPS with an adaptive PWM controller 104, the monitoring circuitry 126 may dynamically select the desired PWM mode for any given time based on grid needs and/or an analysis of grid parameters. Further, the monitoring circuitry 126 may be provided as a component of the adaptive DC conversion system 100 (e.g., as illustrated in FIG. 1), as a component of the adaptive PWM controller 104, or as a component external to the adaptive DC conversion system 100.

Referring now to FIGS. 2A-2D, a UPS 202 providing DGS features that includes an adaptive DC conversion system 100 is described in accordance with one or more embodiments of the present disclosure. It is to be understood, however, that an adaptive DC conversion system 100 as disclosed herein is not limited to UPS systems, but may rather be implemented within any application or system utilizing a switched-mode DC converter. In this way, the descriptions of the adaptive DC conversion system 100 within the context of the UPS 202 are illustrative rather than limiting.

It is contemplated herein that a UPS 202 providing DGS features may operate with a primary mission of protecting critical loads and a secondary mission of providing grid services. For example, the primary mission of protecting critical loads may include, but is not limited to, providing high-quality, mission-critical power to loads on an output side of the UPS. By way of another example, the secondary mission of providing grid services may include providing various support to the grid such as, but not limited to, frequency regulation, voltage regulation, grid capacity, power plant operations, or energy storage.

As an illustration, FIGS. 2A-2D illustrate various non-limiting UPS operational modes that may be implemented by a UPS 202 with DGS features, in accordance with one or more embodiments of the present disclosure. In the non-limiting illustrations shown in FIGS. 2A-2D, the UPS 202 includes a connection to AC grid input power 204 (e.g., from a main utility grid) and a battery 206 connected to a buck-booster DC converter 208 (e.g., the adaptive DC conversion system 100) to provide DC power. The UPS 202 further includes a rectifier 210 to convert the AC grid input power 204 to DC power and an inverter 212 to generate AC output power 214 from either the rectified grid input power 204 or from the battery 206. This AC output power 214 may be used for any purpose including, but not limited to, powering one or more loads connected to the UPS 202 (not shown). The UPS 202 may also include, but is not required to include, a bypass 216 to bypass the rectifier 210 and the inverter 212 to directly provide AC output power 214 from the AC grid input power 204.

It is contemplated herein that each of the UPS operational modes depicted in FIGS. 2A-2D may be implemented by operating the multi-mode DC converter circuit 102 of the adaptive DC conversion system 100 (represented simply as the buck-booster DC converter 208) in either a single PWM mode or a complementary PWM mode. However, operation of the multi-mode DC converter circuit 102 in a complementary PWM mode may facilitate rapid switching between any of the UPS operational modes. In this way, the UPS may enable DGS operation by supporting rapid changes in the UPS operational modes based on changing conditions of the grid and/or the load, based on control signals and/or commands from an external control, or the like.

Figure 2A:
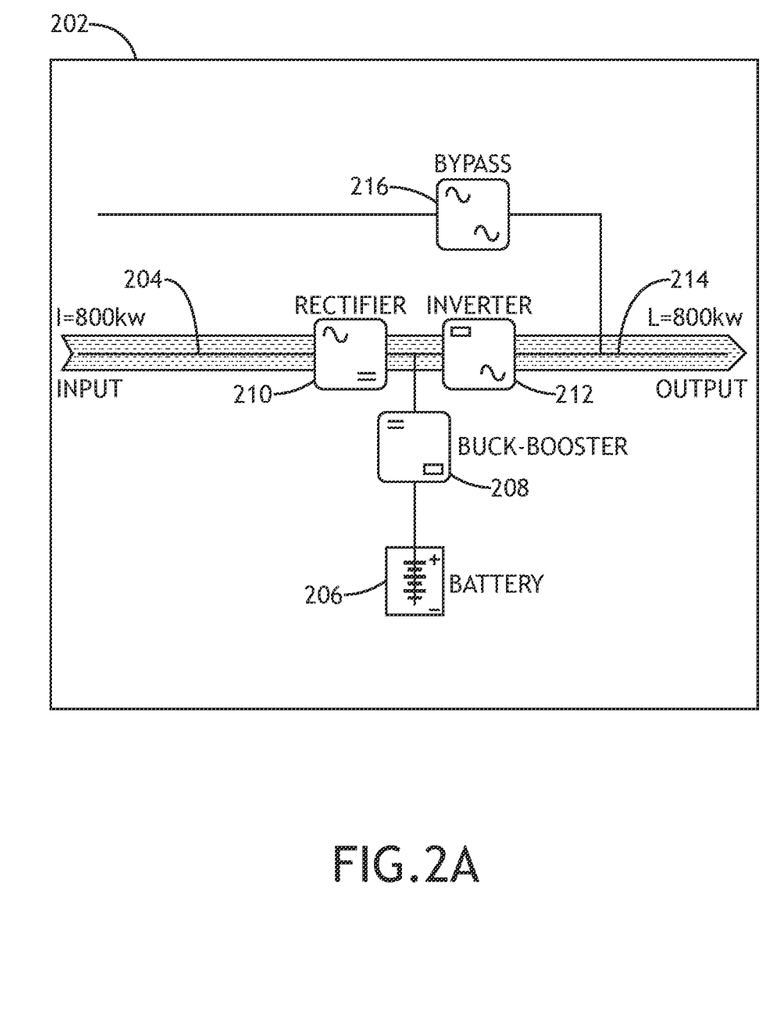
FIG. 2A illustrates a standard UPS operational mode, in accordance with one or more embodiments of the present disclosure.

FIG. 2A illustrates a full grid connection UPS operational mode, in accordance with one or more embodiments of the present disclosure. In this first operational mode, 100% of the output power 214 is provided by the grid input power 204. Accordingly, the UPS 202 may operate as a standard double-conversion UPS. For example, FIG. 2A illustrates 800 kW of output power 214 provided fully from the grid input power 204. Further, in this first operational mode, the battery 206 may be at or near capacity such that the power flow is near zero. The PWM signals to the multi-mode DC converter circuit 102 may thus be selected to neither charge nor discharge the battery 206 and/or maintain the battery 206 in a floating charge state by providing a low current. It is contemplated herein that operating the multi-mode DC converter circuit 102 of the adaptive DC conversion system 100 in a single PWM mode providing DCM operation may be suitable for this UPS operational mode to provide power-efficient operation in a standard UPS state where DGS operation is not necessary, not requested by the monitoring circuitry 126, and/or not requested by an external source. Alternatively, operating the multi-mode DC converter circuit 102 of the adaptive DC conversion system 100 in a complementary PWM mode providing CCM operation may be suitable for DGS operation in cases where the battery 206 is at or near capacity.

Figure 2B:
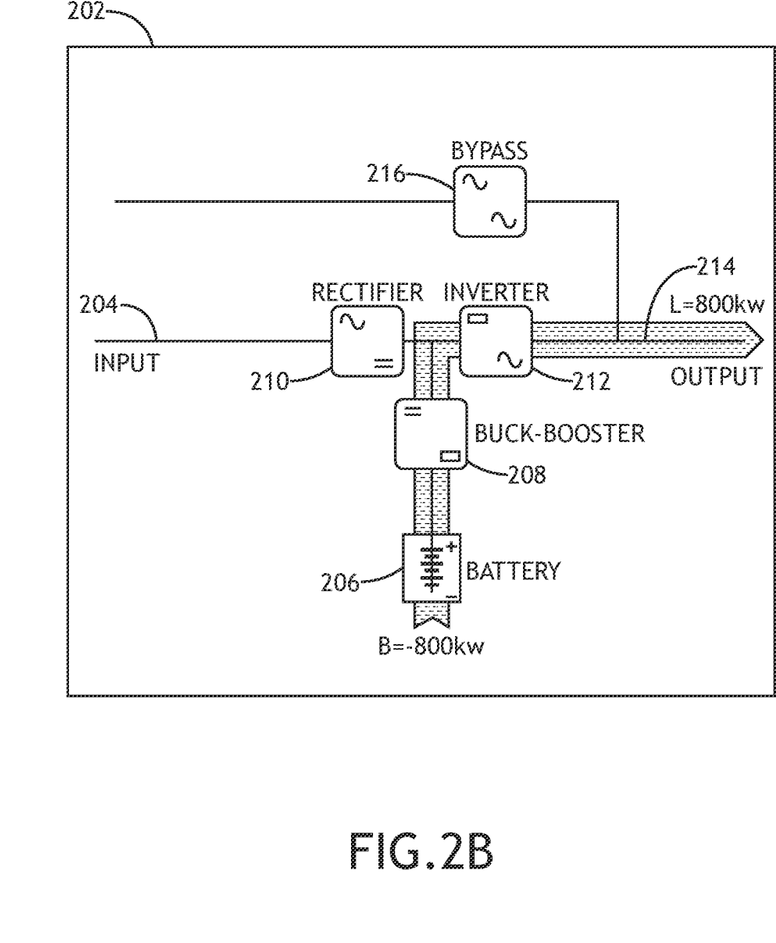
FIG. 2B illustrates a full discharge mode, in accordance with one or more embodiments of the present disclosure.

FIG. 2B illustrates a full discharge UPS operational mode, in accordance with one or more embodiments of the present disclosure. In this mode, 100% of the output power 214 is provided by the battery 206 and the output power 214 is fully disconnected from the grid. For example, FIG. 2B illustrates 800 kW of output power 214 provided fully from the battery 206, which is represented as −800 kW at the battery 206 to highlight power drain from the battery 206. In this operational mode, the UPS 202 may fulfill the primary mission of protecting the load by running the battery 206. The PWM signals to the multi-mode DC converter circuit 102 in this UPS operational mode may be selected to provide boost operation to discharge the battery 206 to provide the AC output power 214.

Figure 2C:
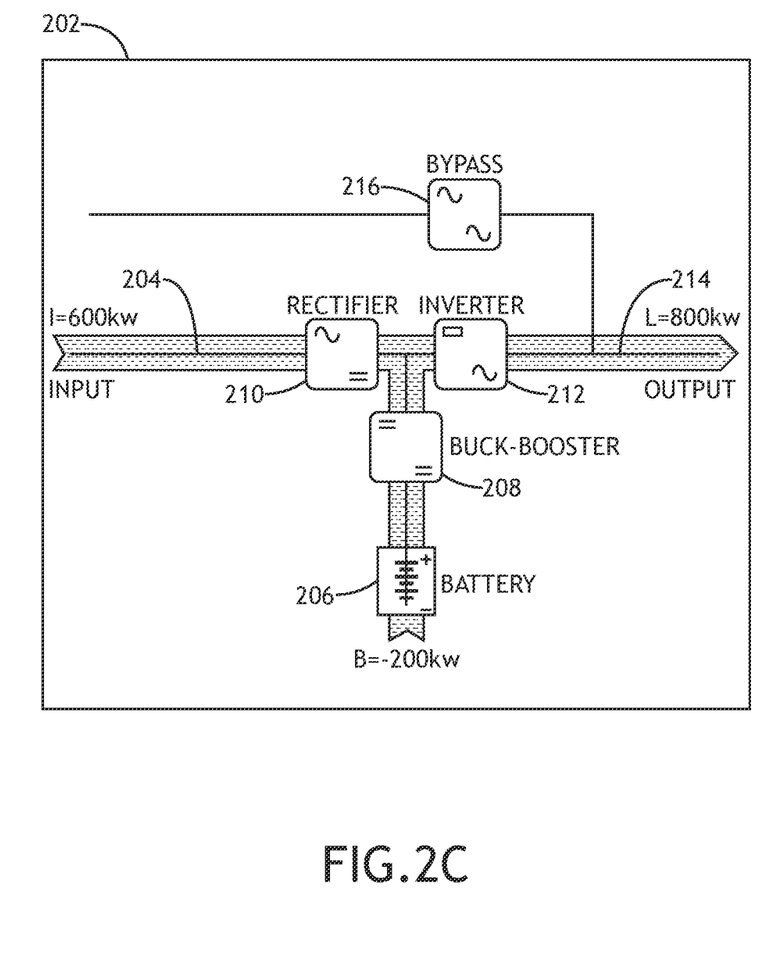
FIG. 2C illustrates a partial discharge mode, in accordance with one or more embodiments of the present disclosure.

FIG. 2C illustrates a partial discharge UPS operational mode, in accordance with one or more embodiments of the present disclosure. This DGS mode may implement regulated power exchange with the grid in which the grid input power 204 is reduced and supplemented with power from the battery 206. For example, FIG. 2C illustrates the combination of 600 kW of grid input power 204 with 200 kW of power from the battery 206 to provide 800 kW of output power 214. In general, however, the output power 214 may be provided by any ratio of power from the grid or the battery 206. The PWM signals to the multi-mode DC converter circuit 102 in this UPS operational mode may be selected to provide boost operation to discharge the battery 206 to provide the desired ratio of the AC output power 214. Operating the multi-mode DC converter circuit 102 in a complementary PWM mode may be suitable for, but is not limited to, cases where the DGS operation is desired and the grid input power 204 is temporarily reduced.

Figure 2D:
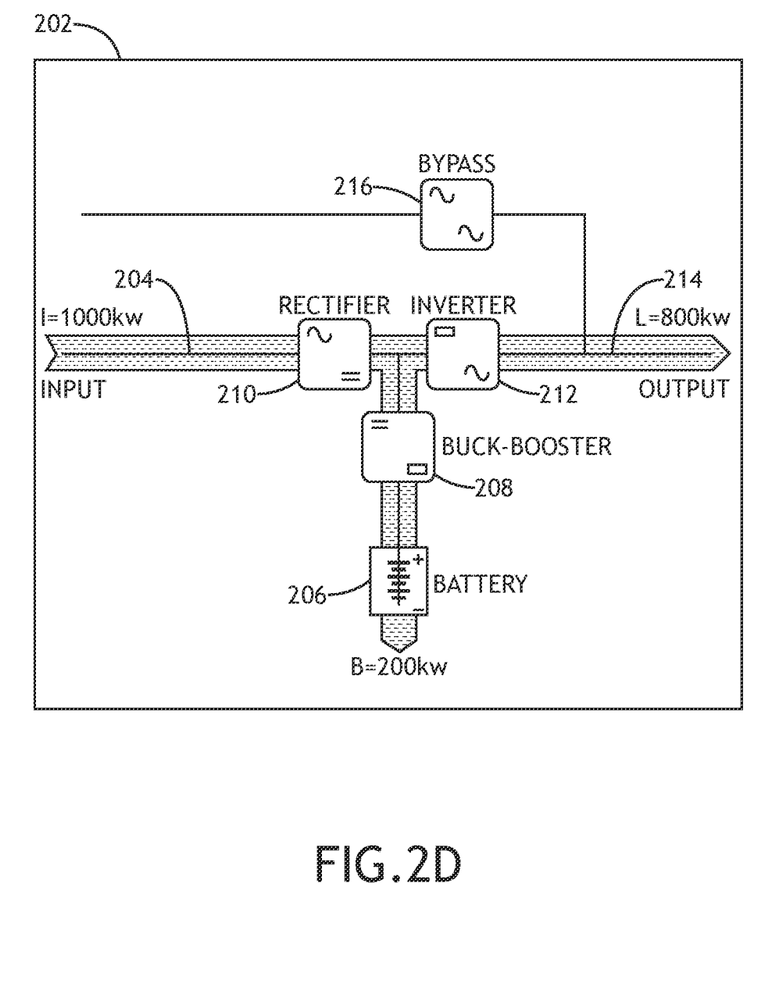
FIG. 2D illustrates a recharge mode, in accordance with one or more embodiments of the present disclosure.

FIG. 2D illustrates a recharge UPS operational mode, in accordance with one or more embodiments of the present disclosure. This DGS mode may implement regulated power exchange with the grid in which the grid input power 204 is increased to provide the desired output power 214 and also charge the battery 206. For example, FIG. 2D illustrates 1000 kW of grid input power 204 split to provide 800 kW of output power 214 and 200 kW to charge the battery 206, which is represented as 200 kW at the battery 206 to highlight charging of the battery 206. In general, however, the grid input power 204 may be divided between the battery 206 and the output power 214 in any ratio. In some embodiments, the maximum power that may be directed to the battery 206 may be limited (e.g., 20% of the available grid input power 204, 25% of the available grid input power 204, or any suitable number). In some cases, this maximum power that may be directed to the battery 206 is limited by the battery 206 such as, but not limited to, the battery recharge capacity, the maximum input current, or the like. The PWM signals to the multi-mode DC converter circuit 102 in this UPS operational mode may be selected to provide buck operation to charge the battery 206 with any desired portion of the input power 204. Operating the multi-mode DC converter circuit 102 in a single PWM mode may be suitable for, but is not limited to, cases where the battery 206 is below capacity, but DGS operation is not necessary. Operating the multi-mode DC converter circuit 102 in a complementary PWM mode may be suitable for, but is not limited to, cases where the battery 206 is below capacity, but DGS operation is desired. For instance, changing load and/or grid conditions may necessitate switching to a different UPS operational mode (e.g., any of the UPS operational modes depicted in FIGS. 2A-2D) and may further impact whether or not DGS operation is appropriate.

It is to be understood that the particular design of the UPS 202 and the DGS modes illustrated in FIGS. 2A-2D are provided solely for illustrative purposes and should not be interpreted as limiting.

Referring now generally to FIGS. 1A-3, a UPS 202 including an adaptive DC conversion system 100 for selective DGS operation is described in greater detail, in accordance with one or more embodiments of the present disclosure.

In some embodiments, a UPS 202 includes an adaptive DC conversion system 100 with a multi-mode DC converter circuit 102 capable of selectively operating in a dynamic PWM mode and a power-saving PWM mode based on PWM signal sets 106 generated by an adaptive PWM controller 104. In this way, the adaptive DC conversion system 100 may provide DGS features (e.g., any of the DGS operational modes illustrated in FIGS. 2A-2D) in at least the dynamic PWM mode and energy-efficient operation in the PWM mode when DGS features are not required.

It is contemplated herein that providing dynamic grid support may require a DC converter with a high responsivity (e.g., high-speed current loop performance) to respond to changing grid conditions. As an illustration, responsivities in the range of 10-100 ms may be required for certain applications.

DC converters may be configured in various ways to provide the requisite high responsivity, though such designs are typically not power efficient at low loads. In some embodiments, the multi-mode DC converter circuit 102 may operate in a complementary PWM mode (e.g., a dynamic mode) in which one or more pairs of power switches 108 are driven by complementary PWM signal sets 106 to maintain inductors 110 within the multi-mode DC converter circuit 102 in a continuous-conduction mode. In such a complementary PWM mode, the continuous-conduction operation of the inductors 110 may facilitate high power-tracking speed required for DGS operation (e.g., operation in a DGS state). In this way, a complementary PWM mode may facilitate rapid switching between various operational modes (e.g., any of the modes illustrated in FIGS. 2A-2D) based on grid conditions.

However, it is contemplated herein that DGS operation (e.g., operation in a DGS state) may not be needed continuously, but rather during limited timeframes. Further, in some applications, timeframes during which DGS operation may be needed may be known in advance, received from an external source (e.g., an external controller, or the like), and/or determinable via monitoring (e.g., with monitoring circuitry 126). Accordingly, in some embodiments, the multi-mode DC converter circuit 102 is further capable of operation in a single PWM mode (e.g., a standard UPS mode) in which the inductors 110 are kept in a discontinuous-conduction mode. For example, in standard UPS operation with buck/booster multi-mode DC converter circuit 102 configured in single PWM mode when the battery 206 is recharging and/or near a full charge and DGS operation is not required, the charging current may be decreased (or decrease naturally) to low values and the voltage (e.g., a charger voltage) may be kept constant or nearly constant (e.g., with a proper modulation of a power switch 108). As a result, the power dissipation in such a single PWM mode may be substantially smaller than in a complementary PWM mode during standard UPS battery charging operations since power losses on power switches 108 and inductors 110 will be lower. Further, in cases where there are relatively long periods of time between DGS operation, an adaptive DC conversion system 100 as disclosed herein may provide substantial improvement in power consumption and associated cost relative to alternative UPS systems without adaptive PWM mode switching.

Figure 3:
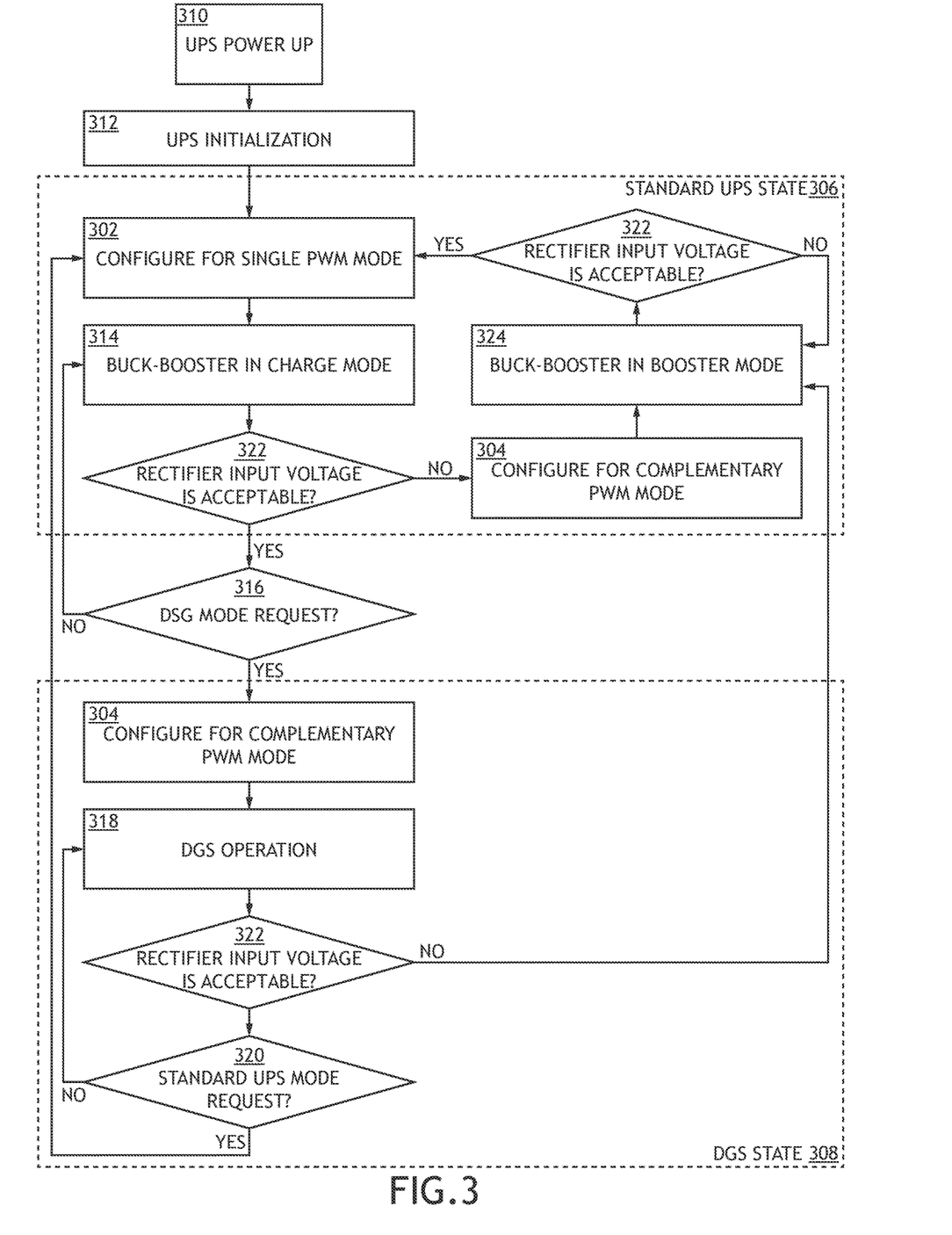
FIG. 3 is a flow diagram illustrating dynamic operation of a UPS with an adaptive DC conversion system in multiple operational modes, in accordance with one or more embodiments of the present disclosure.

FIG. 3 is a flow diagram illustrating dynamic operation of a UPS 202 with an adaptive DC conversion system 100 in multiple operational modes, in accordance with one or more embodiments of the present disclosure. For example, the UPS 202 may have the components illustrated in FIGS. 2A-2D including the rectifier 210 to receive AC grid input power 204, a buck-booster multi-mode DC converter circuit 102 coupled to a battery 206, and an inverter 212 to provide AC output power 214 from any combination of the grid input power 204 or the battery 206.

In particular, FIG. 3 illustrates the operation of the buck-booster multi-mode DC converter circuit 102 in either a single PWM mode (block 302) providing power-efficient operation or a complementary PWM mode (block 304) providing high-speed responsivity. Further, these different PWM modes may be leveraged in multiple circumstances when necessary. For example, FIG. 3 illustrates a standard UPS state 306 in which the UPS 202 operates as a typical UPS (e.g., as illustrated in FIG. 2A) and a DGS state 308 (e.g., a DGS operational mode) providing high-speed operation suitable for any number of operational modes (e.g., any of the operational modes illustrated in FIGS. 2A-2D), where each of the states or operational modes may utilize any number of PWM modes as necessary.

In some embodiments, the UPS 202 initially enters a standard UPS state 306 after power up (block 310) and initialization (block 312) and then switches between the states based on requests. Such requests may include a selection of an operational mode generated using any suitable technique. For example, the selection of an operational state (e.g., the standard UPS state 306 or the DGS state 308) may be performed by a user, by an internal monitor (e.g., monitoring circuitry 126), or by any external source.

In some embodiments, the standard UPS state 306 includes configuring the adaptive PWM controller 104 to provide a single PWM mode (block 302) that places the buck-booster multi-mode DC converter circuit 102 in charge mode (e.g., a buck mode) (block 314) to charge the battery 206 with at least a portion of the grid input power 204 if necessary (see e.g., FIG. 2D).

For example, the adaptive PWM controller 104 may generate PWM signal sets 106 that drive only a single power switch 108 in a way that operates the buck-booster multi-mode DC converter circuit 102 in a charge mode. In this way, the PWM signal sets 106 may provide proper modulation of the power switch 108 to keep the charging current at a relatively low value and provide a constant charger voltage to the battery 206. As a result, the power dissipation in such a single PWM mode may be lower than using a complementary PWM mode under these conditions.

In some embodiments, the UPS 202 enters a DGS state 308 upon a request (block 316). In the DGS state 308, the adaptive PWM controller 104 is configured to operate in a complementary PWM mode (block 304) to provide high responsivity suitable for DGS operations. For example, each of the operational modes illustrated in FIGS. 2A-2D may be implemented using different complementary PWM signal sets 106. Accordingly, DGS operation (block 318) may include operation in any operational mode and/or rapid switching between various operational modes based on the needs of the grid. The UPS 202 may then remain in the DGS state 308 until a request for the standard UPS state 306 is received (block 320).

It is contemplated herein that the use of different PWM modes to selectively provide dynamic operation of a multi-mode DC converter circuit 102 may be advantageous for many applications or situations. In this way, the use of different PWM modes is not limited to selectively providing DGS functionality or traditional UPS functionality. As an illustration, FIG. 3 illustrates the use of a complementary PWM mode (e.g., block 304) for system monitoring in either the standard UPS state 306 or the DGS state 308.

In some embodiments, the UPS 202 may temporarily utilize a complementary PWM mode (block 304) if necessary to provide high-performance operation when needed. For example, FIG. 3 illustrates monitoring a rectifier input voltage (block 322) (e.g., the input voltage of the rectifier 210 illustrated in FIGS. 2A-2D). If the rectifier input voltage is not acceptable, the adaptive PWM controller 104 is configured to provide a complementary PWM mode (block 304) that places the buck-booster multi-mode DC converter circuit 102 in booster mode (block 324). In this way, the multi-mode DC converter circuit 102 can have a fast response required to feed the inverter 212 and the load without interruption in order to satisfy the primary UPS mission of protecting the load. Once the rectifier input voltage is acceptable, the UPS 202 may return to normal operation in either the standard UPS state 306 or the DGS state 308.

Referring again generally to FIGS. 2A-3, it is to be understood that FIGS. 2A-3 are provided solely for illustrative purposes and should not be interpreted as limiting. Rather, an adaptive DC conversion system 100 may generally provide different PWM modes for operation as any type of switched-mode DC converter. In this way, the illustrations and examples referring to operation in the context of a UPS are merely illustrations. Further, the illustrations and examples referring to the particular PWM modes (e.g., the single PWM mode or the complementary PWM mode) are also merely illustrations. It is contemplated herein that an adaptive DC conversion system 100 as disclosed herein may operate in any number or type of PWM modes based on selective use of associated PWM signals to various power switches.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a multi-mode direct current (DC) converter circuit including two or more power switches, wherein the multi-mode DC converter circuit is operable in two or more pulse width modulation (PWM) modes based on two or more PWM signal sets provided to the two or more power switches, wherein the two or more PWM modes comprise:
      a single PWM mode, wherein the single PWM mode includes one or more single PWM signal sets of the two or more PWM signal sets, wherein each of the one or more single PWM signal sets includes PWM signals to modulate a single one of the two or more power switches; and
      a complementary PWM mode, wherein the complementary PWM mode includes one or more complementary PWM signal sets of the two or more PWM signal sets, wherein each of the one or more complementary PWM signal sets includes PWM signals to modulate one or more pairs of the two or more power switches with a complementary pattern; and
   a PWM controller, wherein the PWM controller controls which of the two or more PWM modes the multi-mode DC converter circuit operates in by providing the multi-mode DC converter circuit with an associated one of the two or more PWM signal sets.

2. The system of claim 1, wherein the PWM controller switches between any of the two or more PWM modes of the multi-mode DC converter circuit in response to a mode selection request.

3. The system of claim 2, wherein the mode selection request is provided by at least one of monitoring circuitry, a user, or an external source.

4. The system of claim 3, wherein the monitoring circuitry generates the mode selection request based on an analysis of at least one of the multi-mode DC converter circuit or one or more components connected to the system.

5. The system of claim 1, wherein the single PWM mode induces a discontinuous-conduction mode in at least one inductor in the multi-mode DC converter circuit.

6. The system of claim 1, wherein the complementary PWM mode induces a continuous-conduction mode in at least one inductor in the multi-mode DC converter circuit.

7. The system of claim 1, wherein the system is operable in a first operational mode, wherein the PWM controller provides any of the one or more single PWM signal sets during the first operational mode, wherein the system is operable in a second operational mode, wherein the PWM controller provides any of the one or more complementary PWM signal sets during the second operational mode.

8. The system of claim 7, wherein the one or more complementary PWM signal sets comprises two or more complementary PWM signal sets, wherein the two or more complementary PWM signal sets induce a continuous-conduction mode in at least one inductor in the multi-mode DC converter circuit.

9. The system of claim 7, wherein the one or more complementary PWM signals sets of the complementary PWM mode provide dynamic grid support operation.

10. The system of claim 7, wherein the PWM controller switches between any of the two or more PWM modes of the multi-mode DC converter circuit in response to a mode selection request.

11. The system of claim 1, wherein the multi-mode DC converter circuit comprises:
    at least one of a buck DC converter circuit, a boost DC converter circuit, or a buck-booster DC converter circuit.

12. The system of claim 1, wherein the PWM controller comprises:
    at least one of a digital signal processor or a field-programmable gate array (FPGA) device.

13. An uninterruptible power supply (UPS) comprising:
    a rectifier to rectify input power from an electrical grid;
    a battery;
    a direct current (DC) conversion system coupled to the battery, the DC conversion system comprising:
       a multi-mode DC converter circuit including two or more power switches, wherein the multi-mode DC converter circuit is operable in two or more pulse width modulation (PWM) modes based on two or more PWM signal sets provided to the two or more power switches, wherein the two or more PWM modes comprise:
          a single PWM mode, wherein the single PWM mode includes one or more single PWM signal sets of the two or more PWM signal sets, wherein each of the one or more single PWM signal sets includes PWM signals to modulate a single one of the two or more power switches; and
          a complementary PWM mode, wherein the complementary PWM mode includes one or more complementary PWM signal sets of the two or more PWM signal sets, wherein each of the one or more complementary PWM signal sets includes PWM signals to modulate one or more pairs of the two or more power switches with a complementary pattern;
       a PWM controller, wherein the PWM controller controls which of the two or more PWM modes the multi-mode DC converter circuit operates in by providing the multi-mode DC converter circuit with an associated one of the two or more PWM signal sets; and
    an inverter to generate an alternating current (AC) power output from at least one of the rectifier or the DC conversion system.

14. The UPS of claim 13, wherein the PWM controller switches between any of the two or more PWM modes of the multi-mode DC converter circuit in response to a mode selection request.

15. The UPS of claim 14, wherein the mode selection request is provided by at least one of monitoring circuitry, a user, or an external source.

16. The UPS of claim 15, wherein the monitoring circuitry generates the mode selection request based on an analysis of at least one of the multi-mode DC converter circuit or one or more components connected to the UPS.

17. The UPS of claim 16, wherein the single PWM mode induces a discontinuous-conduction mode in at least one inductor in the multi-mode DC converter circuit.

18. The UPS of claim 16, wherein the complementary PWM mode induces a continuous-conduction mode in at least one inductor in the multi-mode DC converter circuit.

19. The UPS of claim 16, wherein the UPS is operable in a first operational mode, wherein the PWM controller provides any of the one or more single PWM signal sets during the first operational mode, wherein the UPS is operable in a second operational mode, wherein the PWM controller provides any of the one or more complementary PWM signal sets during the second operational mode.

20. The UPS of claim 19, wherein the one or more complementary PWM signal sets comprise two or more complementary PWM signal sets, wherein the two or more complementary PWM signal sets induce a continuous-conduction mode in at least one inductor in the multi-mode DC converter circuit.

21. The UPS of claim 19, wherein the one or more complementary PWM signals sets of the complementary PWM mode provides dynamic grid support operation.

22. The UPS of claim 20, wherein the two or more complementary PWM signal sets are configured to at least two of provide the AC power output from the input power alone, providing the AC power output from the battery alone, provide the AC power output from a combination of the input power and the battery, or charge the battery while providing the AC power output using the input power.

23. The UPS of claim 13, wherein the PWM controller switches between any of the two or more PWM modes of the multi-mode DC converter circuit in response to a mode selection request.

24. The UPS of claim 13, wherein the multi-mode DC converter circuit comprises:
at least one of a buck DC converter circuit, a boost DC converter circuit, or a buck-booster DC converter circuit.

25. The UPS of claim 13, wherein the PWM controller comprises:
at least one of a digital signal processor or a field-programmable gate array (FPGA) device.

26. The UPS of claim 16, wherein the DC conversion system provides power to or from a battery.

27. The UPS of claim 26, wherein the single PWM mode has lower losses than the complementary PWM mode, wherein the PWM controller implements the single PWM mode in a low-load condition determined by at least one of monitoring circuitry or control signals.

28. The UPS of claim 26, wherein the one or more complementary PWM signal sets comprises two or more complementary PWM signal sets providing different power regulation to or from the battery, wherein the PWM controller switches between the two or more complementary PWM signals sets while in the complementary PWM mode in response to at least one of monitoring circuitry or control signals.

29. The UPS of claim 13, wherein the single PWM mode has lower losses than the complementary PWM mode, wherein the PWM controller implements the single PWM mode in a low-load condition determined by at least one of monitoring circuitry or control signals.

30. The UPS of claim 13, wherein the one or more complementary PWM signal sets comprises two or more complementary PWM signal sets providing different power regulation to or from the battery, wherein the PWM controller switches between the two or more complementary PWM signals sets while in the complementary PWM mode in response to at least one of monitoring circuitry or control signals.

31. The UPS of claim 30, wherein the two or more complementary PWM signals sets provide:
at least one of a full grid connection UPS operational mode in which a load is powered by the electrical grid, a full discharge UPS operational mode in which the load is powered by the battery, a partial discharge UPS operational mode in which the load is powered by a combination of the electrical grid and the battery, or a recharge operational mode in which at least a portion of power supplied by the electrical grid charges the battery.

* * * * *